(12) United States Patent
Thompson

(10) Patent No.: US 7,408,118 B2
(45) Date of Patent: Aug. 5, 2008

(54) TRUNKING AND CONNECTING MEANS THEREFOR

(76) Inventor: Richard J. Thompson, 7 Holywood, Wolsingham, Bishop Auckland, CO Durham (GB)

(*) Notice: Subject to any disclaimer, the term of this patent is extended or adjusted under 35 U.S.C. 154(b) by 148 days.

(21) Appl. No.: 10/546,507

(22) PCT Filed: Feb. 25, 2004

(86) PCT No.: PCT/GB2004/000743

§ 371 (c)(1),
(2), (4) Date: May 5, 2006

(87) PCT Pub. No.: WO2004/077634

PCT Pub. Date: Sep. 10, 2004

(65) Prior Publication Data

US 2006/0243475 A1      Nov. 2, 2006

(30) Foreign Application Priority Data

Feb. 28, 2003  (GB) ................................. 0304535.8

(51) Int. Cl.
*H01B 7/00* (2006.01)

(52) U.S. Cl. .................. 174/135; 174/68.1; 174/135; 174/19; 174/481; 52/220.7; 248/68.1; 439/207; 138/109

(58) Field of Classification Search ................ 174/135, 174/68.1, 68.3, 72 A, 72 C, 97, 96, 19, 481, 174/496, 37; 52/220.7, 220.1, 220.5; 439/207; 248/68.1; 385/136; 138/109, 155
See application file for complete search history.

(56) References Cited

U.S. PATENT DOCUMENTS

| 4,018,976 | A  | * | 4/1977  | Grove ........................... 174/19 |
| 5,962,809 | A  | * | 10/1999 | Duvall et al. ................... 174/37 |
| 6,459,037 | B2 | * | 10/2002 | Muller et al. ................... 174/19 |
| 6,727,434 | B2 | * | 4/2004  | Jadaud et al. ................. 174/135 |
| 6,756,539 | B1 | * | 6/2004  | VanderVelde ............... 174/496 |
| 6,756,544 | B2 | * | 6/2004  | Handler ....................... 174/68.1 |
| 6,903,265 | B1 | * | 6/2005  | VanderVelde et al. ........ 174/481 |
| 6,972,367 | B2 | * | 12/2005 | Federspiel et al. ........... 174/481 |

* cited by examiner

*Primary Examiner*—Dhiru R Patel
(74) *Attorney, Agent, or Firm*—Jack Schwartz & Associates, PLLC

(57) ABSTRACT

A trunking section (50) is described and has a body (51) with sides (52a, 52b and 52c) which form a channel (54). Trunking section (50) also has an end portion (62) inserted into first end (56) such that it engages the internal surfaces of sides (52a, 52b and 52c) and is welded thereto. End portion (62) is provided with a first aperture (64) which is adapted to receive a bush connector (66) and has four curved edges (70) and four straight edges (72) therebetween. The bush connector (66) has a male part (74) and a female part (76). Male part (74) has a tubular body (78) which has an aperture (80), it has external first threaded surfaces (82) and rotation prevention means, in the form of flat portions (84). Bush connector (66) also has a female part (76) with an internal second thread (88) which engages first threaded portions (82) of male part (74).

10 Claims, 3 Drawing Sheets

TRUNKING AND CONNECTING MEANS THEREFOR

FIELD OF THE INVENTION

The present invention relates to trunking and connecting means therefor and specifically, but not exclusively, to sections of trunking and connecting means which provide a waterproof enclosure for carrying electrical cables.

BACKGROUND OF THE INVENTION

The use of trunking to carry electrical cables is well known. Such trunking is commonly used in the pharmaceutical, food and beverage industries and in such circumstances it is of particular importance that the external surfaces of the trunking are easily cleaned. Typically such trunking may be provided with waterproof seals so that it may be cleaned by directing a jet of water at the trunking the seals preventing any of the water gaining access to the electrical cables inside.

An example of such a trunking system is shown in FIG. 1 in which trunking sections 10 and 12, having respective lids 14 and 16, are joined by a coupling 18. Trunking sections 10 and 12, lids 14 and 16 and coupling 18 are all formed by the pressing of sheet stainless steel. Coupling 18 is formed such that its external surfaces engage with the internal surfaces of trunking sections 10 and 12. Trunking sections 10 and 12 are also provided with holes 20 which are adapted to receive screws or other similar securing means (not shown) which in turn engage with holes 22 in coupling 18.

Trunking and coupling of this type have the disadvantage that it can be difficult to form a waterproof seal between the trunking sections 10 and 12 and coupling 18. For example, the number of screws which need to be inserted through apertures 20 and 22 make the installation process quite complex. Furthermore, this number of external fixings, each of which would typically have a slot or cross head, for engagement with a screw driver, are likely to attract dirt and are therefore provide potential infestation sites and make the cleaning process more difficult. This form of fixing also provides a direct route for ingress of water from the outside to the inside of the trunking where electrical cables are housed. For example, if a pressurised jet of water is directed onto the screws, it is possible for water to travel along the thread of the screw, under a capillary action, from the outside of trunking sections 10 and 12 to the inside of coupling 18.

A further problem found in trunking of this type is that the alignment of the trunking sections 10 and 12, coupling 18 and the screws inserted therein is of particular importance. The tolerance in the location of holes 20 and 22 must be very precise in order that the joining of the sections 10 and 12 is properly waterproofed. When screws are inserted into holes 20, 22 and are tightened it is possible for distortion of trunking sections 10 and 12 and coupling 18 to occur. This in turn causes the lid engaging edges 24 to not be correctly aligned. As a result, either lids 14 and 16 do not properly engage these edges 24 or the distortion of trunking sections 10 and 12 causes the ends of lids 14 and 16 to be incorrectly aligned with each other. This will further reduce the waterproof connection between the lids 14 and 16.

Preferred embodiments of the present invention seek to overcome the above described disadvantages of the prior art.

BRIEF SUMMARY OF THE INVENTION

According to an aspect of the present invention there is provided a trunking section comprising:

a body defining at least one channel for receiving at least one cable, the body defining a respective first aperture at least one end of the or each said channel, and at least one second aperture, for providing access to the or each said channel and adapted to receive at least one respective lid for closing said aperture, wherein at least one said first aperture is adapted to receive a respective bush connector for connecting said trunking section to a further trunking section; and rotation prevention means for preventing rotation of said trunking section relative to a said further trunking section mounted thereto by means of at least one said bush connector.

By providing a trunking section adapted to be joined to a further trunking section using a bush connector, the advantage is provided that a system of trunking can be quickly and easily installed. In particular the single connecting means, in the form of the bush connector, between adjacent pairs of trunking sections is significantly quicker to install than those of the prior art. Furthermore, the structural support provided by the end portions of the trunking sections in which the first aperture is located provides the advantage that the flexibility of the trunking section is reduced and in particular this improves the fit of the lid relative to the trunking sections thereby improving the waterproofing of these components relative to each other. As a result, it is possible to reduce the number of fixings which are used to attach the lid to the trunking section thereby reducing the number of potential dirt traps. Since the rigidity of the trunking sections is increased by the inclusion of the end portions the sections maybe provided in longer lengths without any loss of structural strength. Alternatively it is possible to reduce the thickness of the sheet steel used in producing the section without compromising the structural rigidity compared to the prior art. Furthermore, by eliminating the use of apertures and screws as seen in the prior art to fix a coupling between two trunking sections, the advantage is provided that ingress of water along threads of fixing screws is eliminated. When two trunking sections of the present invention are joined to one another, using the bush connector, these sections are effectively completely sealed with the only potential point of ingress being along the junction between the two sections and then around the thread of the bush connector. In practice such ingress can easily be prevented using a gasket seal or adhesive type sealant.

In a preferred embodiment said body is formed from pressed stainless steel sheet.

In another preferred embodiment said second aperture extends from a first end of at least one said channel to a second end of at least one said channel.

By providing the second aperture extending along the length of the channel, and in particular in a linear length of trunking, it is possible to produce such a linear trunking section without the need for any welds (other than those used to connect the end portions, containing the first apertures, to the body).

In a preferred embodiment said rotation prevention means comprises at least one portion of the or each first aperture being adapted to engage a portion of a said bush connector such that said trunking section cannot rotate relative to said bush connector when engaged therein.

In a preferred embodiment said portion of the first aperture is substantially flat.

In a further preferred embodiment said rotation prevention means is adapted to be used in any one of four angles, each separated by 90°, such that the trunking section can be mounted to further trunking section at any of said angles.

By providing four angles of engagement for the rotation prevention means, the advantage is provided that where a junction or corner piece of trunking is engaged with a length of linear trunking the corner junction piece can extend from the linear section in any one of four directions. Therefore it is not necessary to produce a different corner or junction piece for each direction.

In a preferred embodiment said first aperture is adapted so as not to extend beyond an outer edge of a retaining portion of a male portion of a bush connector.

By enclosing the first aperture entirely around the bush connector the waterproofing of the seal between adjacent sections of trunking is improved.

According to another aspect of the present invention there is provided a bush connector for joining a first trunking section to a second trunking section, the bush connector comprising:

a male part having a tubular body with an aperture extending therethrough and at least one first threaded portion on an external surface of said body, the male part also having a retaining portion for retaining said part in engagement with an aperture in a first trunking section;

a female part having a second threaded portion adapted to engage at least one said first threaded portion of said male part and adapted to retain a second trunking section in engagement with said first trunking section; and rotation prevention means for preventing rotation of said male part relative to said first or second trunking sections.

By providing a bush connector of the type described above, the advantage is provided that a simple connecting means for joining trunking sections of the type described above may be provided having one or more of the above described advantages. By providing the bush connector with at least one rotation prevention means the advantage is provided that once the trunking is installed individual sections of trunking cannot rotate relative to one another. If this rotation was allowed to occur the transition from one section of trunking to another would not be smooth and a dirt trap would form at the junction between the trunking sections. This would be particularly difficult to clean and therefore unsatisfactory to the industries at which this product is aimed. Furthermore, the use of a bush of the type described above provides the advantage that the internal surfaces of the male part may provide an ideal cable support, having smooth surfaces, thereby preventing snagging of the cables as they are fed through the trunking network.

In a preferred embodiment at least a portion of said external surface of said body of said male part is adapted to engage a portion of an aperture within an end portion of a trunking section such that said trunking section cannot rotate relative to said bush connector when engaged therewith.

In another preferred embodiment said portion of said bush connector is substantially flat.

BRIEF DESCRIPTION OF THE DRAWINGS

Preferred embodiments of the present invention will now be described by way of example only, and not in any limititive sense, with reference to the accompanying drawings in which:—

DETAILED DESCRIPTION OF THE INVENTION

Figure 1:
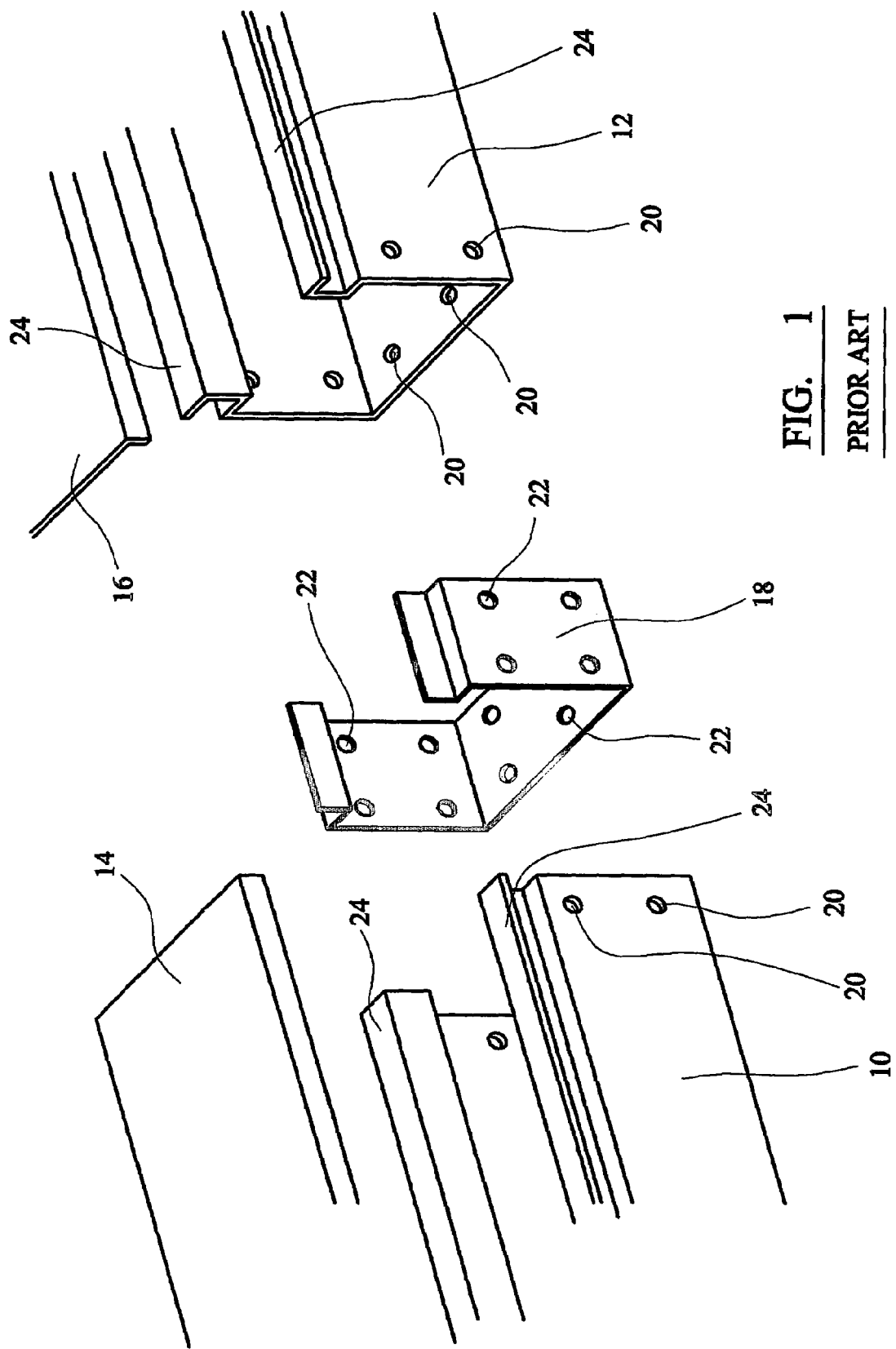
FIG. 1 is a perspective view of trunking sections and a coupling of the prior art.
Figure 2:
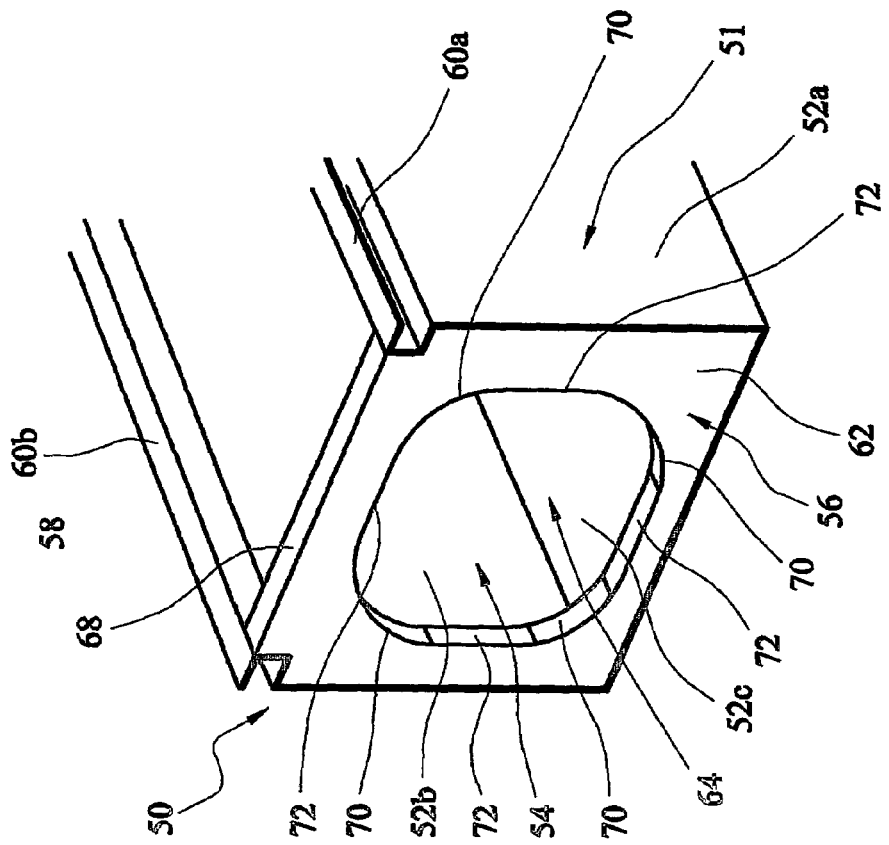
FIG. 2 is a perspective view of two trunking sections of the present invention.
Figure 2:
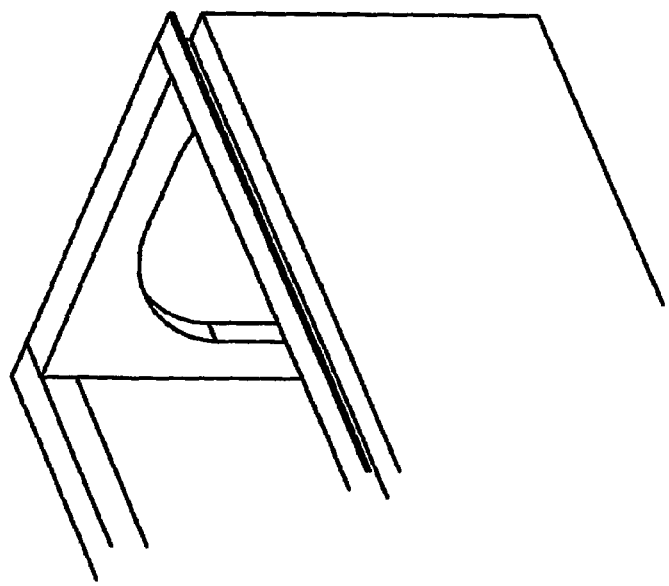
Figure 3:
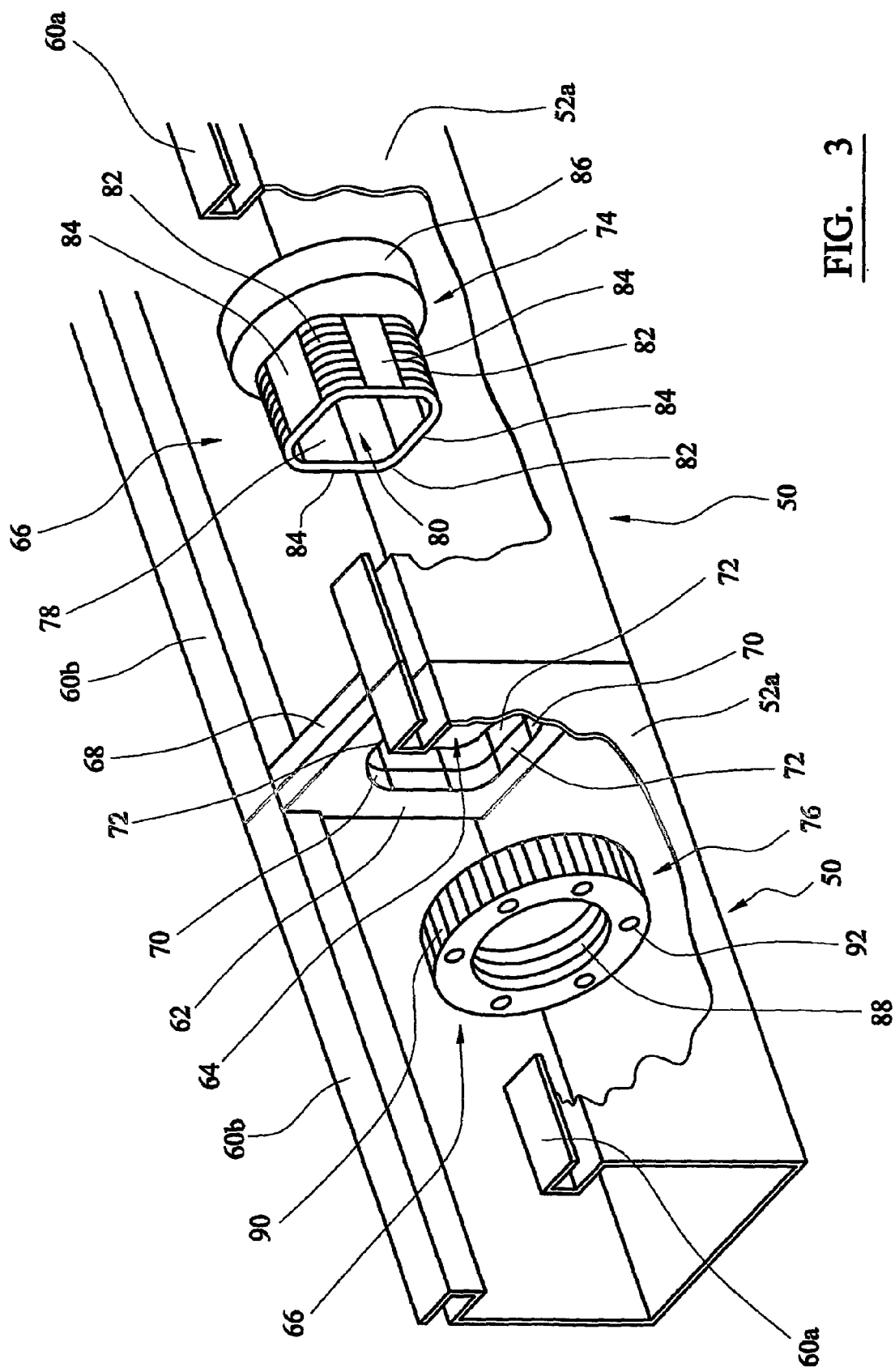
FIG. 3 is a sectional perspective view of the trunking sections of FIG. 2 together with connecting means of the present invention.

Referring to FIGS. 2 and 3, a trunking section 50 has a body 51 with sides 52*a*, 52*b* and 52*c*. These sides 52*a*, 52*b* and 52*c* form a channel 54 between a first end 56 and a second end (not shown). Body 51 is also provided with a second aperture 58 which is adapted to provide access to channel 54 thereby allowing cables (not shown) to be laid in trunking section 50. Second aperture 58 is provided with side portions 60*a* and 60*b*, formed as part of sides 52*a* and 52*b*, these portions being adapted to engage with a lid (not shown, but of the type labelled 14 or 16 in FIG. 1).

Trunking section 50 also has an end portion 62 inserted into first end 56 such that it engages the internal surfaces of sides 52*a*, 52*b* and 52*c* and is welded thereto. Ideally this welding should form a substantially waterproof seal between the end portion 62 and the sides 52*a*, 52*b* and 52*c*. End portion 62 is provided with a first aperture 64 which is adapted to receive a bush connector 66. End portion 62 is joined with body 51 such that an upper edge 68 of end portion 62 forms a substantially continuous surface with edge portion 60*a* and 60*b*. As a result the lid (not shown) engages each of these edges 60*a*, 60*b* and 68.

First aperture 64 has four curved edges 70 and four portions that act as rotation prevention devices in the form of straight edges 72 there between. If curved edges 70 were extended such that they were all joined together they would form a circle.

Bush connector 66 has a male part 74 and a female part 76. Male part 74 has a tubular body 78 which has an aperture 80 extending there through. Body 78 has external first threaded surfaces 82 and rotation prevention devices, in the form of flat portions 84 also on the external surface of body 78. Male part 74 also has a retaining portion 86 for preventing male part 74 from passing all the way through first aperture 64. Retaining portion 86 extends so as to entirely cover first aperture 64.

Bush connector 66 also has a female part 76 with an internal second thread 88 which engages first threaded portions 82 of male part 74. Female part 76 also has a grooved external surface 90 and tightening holes 92.

In use trunking sections 50 are laid end to end such that end portions 62 are adjacent and first apertures 64 and sides 52*a*, 52*b* and 52*c* are all aligned. Male part 74 of bush connector 66 is inserted through the aligned first apertures 64 such that the flat portions 84 of body 78 engage with flat portions 72 of first aperture 64. Curved portions 70 of aperture 64 should be sufficiently large to allow the curved threaded portions 82 of body 78 to pass comfortably therethrough and flat portions 84 and 72 should fit closely with one another so as to prevent rotation of trunking sections 50 relative to male part 74 of bush connector 66. First aperture 64 and male part 74 are provided with four flat portions 74 and 84 such that a first trunking section 50 may be connected to a second trunking section at any of four equally spaced 90° angles. This is of particular importance where corner sections are used such that a single corner section turning through 90° can extend from an elongate section of trunking in any of four directions (i.e. up down or to the left or right).

Female part 76 of bush connector 66 is then introduced to male part 74 and threaded portions 88 and 82 are engaged. Once the female part is hand tightened relative to the male part a two pinned tool may be inserted into two of the tightening holes 92 so as to provide leverage allowing a final tightening of the bush connector. Cables then may then be laid along channel 54 and through aperture 64.

It would be appreciated by persons skilled in the art that the above embodiment has been described by way of example only, and not in any limititive sense, and that various alterations and modifications are possible without departure from the scope of the invention as defined by the appended claims. For example, bush connector 66 and first aperture 64 may not be provided with flat portions 84 and 72 by way rotation prevention means by replacing these portions with an alternative. End portion 62 of one trunking section 50 may be provided with a pin extending beyond the end of trunking section 50, this pin being aligned with a respective hole in the end portion 62 of an adjacent trunking section 50. In particular, one pin may be provided adjacent one corner of end portion 62 and four holes might be provided in the adjacent end portion such that the trunking sections may be aligned at four angles 90° apart from each other.

The invention claimed is:

1. A trunking section comprising:
a body defining at least one channel for receiving at least one cable, the body defining a respective first aperture at least one end of said at least one channel, and at least one second aperture, for providing access to said at least one channel and adapted to receive at least one respective lid for closing said second aperture, wherein at least one said first aperture is adapted to receive a respective bush connector for connecting said trunking section to a further trunking section; and
at least one rotation prevention device for preventing rotation of said trunking section relative to said further trunking section mounted thereto by means of at least one said bush connector.

2. A trunking section according to claim 1, wherein said body is formed from pressed stainless steel sheet.

3. A trunking section according to claim 1, wherein at least one said second aperture extends from a first end of at least one said channel to a second end of at least one said channel.

4. A trunking section according to claim 3, wherein at least one said rotation prevention device comprises at least one portion of the first aperture being adapted to engage a portion of said bush connector such that said trunking section cannot rotate relative to said bush connector when engaged therein.

5. A trunking section according to claim 4, wherein said portion of said first aperture is substantially flat.

6. A trunking section according to claim 5, wherein at least one said rotation prevention device is adapted to be used in any one of four angles, each separated by 90 degrees, such that the trunking section can be mounted to said further trunking section at any of said angles.

7. A trunking section according to claim 6 wherein said first aperture is adapted so as not to extend beyond an outer edge of a retaining portion of a male portion of said bush connector.

8. A bush connector for joining a first trunking section to a second trunking section, the bush connector comprising;
a male part having a tubular body, with an aperture extending therethrough and at least one first threaded portion on an external surface of said body, the male part also having a retaining portion for retaining said part in engagement with an aperture in a first trunking section;
a female part having an second threaded portion adapted to engage at least one said first threaded portion of said male part and adapted to retain a second trunking section in engagement with said first trunking section; and
at least one rotation prevention device for preventing rotation of said male part relative to said first or second trunking sections.

9. A bush connector according to claim 8, wherein at least a portion of said external surface of said body of said male part is adapted to engage a portion of an aperture within an end portion of a trunking section such that said trunking section cannot rotate relative to said bush connector when engaged therewith.

10. A bush connector according to either claim 8, wherein said portion of said bush connector is substantially flat.

* * * * *